(12) United States Patent
Hamada

(10) Patent No.: US 7,546,023 B2
(45) Date of Patent: Jun. 9, 2009

(54) METHOD AND APPARATUS FOR PROTECTING BROADCAST DATA

(75) Inventor: Ichiro Hamada, Kanagawa (JP)

(73) Assignee: Sony Corporation (JP)

( * ) Notice: Subject to any disclaimer, the term of this patent is extended or adjusted under 35 U.S.C. 154(b) by 784 days.

(21) Appl. No.: 10/534,141

(22) PCT Filed: Nov. 19, 2003

(86) PCT No.: PCT/JP03/14707

§ 371 (c)(1),
(2), (4) Date: May 9, 2005

(87) PCT Pub. No.: WO2004/047439

PCT Pub. Date: Jun. 3, 2004

(65) Prior Publication Data

US 2006/0110129 A1 May 25, 2006

(30) Foreign Application Priority Data

Nov. 21, 2002 (JP) ............................. 2002-338200

(51) Int. Cl.
*H04N 5/76* (2006.01)
(52) U.S. Cl. .................... 386/94; 386/E50.04; 380/203
(58) Field of Classification Search .................. 386/94, 386/95, E50.04; 380/200–203, 234
See application file for complete search history.

(56) References Cited

U.S. PATENT DOCUMENTS

2002/0056115 A1* 5/2002 Yoneda et al. ................. 725/86

FOREIGN PATENT DOCUMENTS

| EP | 0 994 621 A2 | 4/2000 |
| EP | 1 085 740 A2 | 3/2001 |
| JP | 2000-123480 A | 4/2000 |
| JP | 2001-86452 A | 3/2001 |
| JP | 2002-124927 A | 4/2002 |
| WO | WO-01/33851 A1 | 5/2001 |

* cited by examiner

*Primary Examiner*—David E Harvey
(74) *Attorney, Agent, or Firm*—Lerner, David, Littenberg, Krumholz & Mentlik, LLP

(57) ABSTRACT

A broadcasting system, a receiving apparatus, a broadcasting method, and a receiving method which can protect a copyright of a still image which is sent by a digital broadcast are provided. When it is necessary to protect the copyright of the still image in the digital broadcast, a still image copy control descriptor is described and this still image copy control descriptor is included in PMT, EIT, and SDT. By using the still image copy control descriptor, the operation of a receiver can be finely described by copyright information of the still image in the digital broadcast and copyright information. Printing in the receiver of contents of the digital broadcast can be finely controlled. Recording to a recording medium in the receiver of contents of the digital broadcast can be finely controlled.

31 Claims, 11 Drawing Sheets

Fig. 1

| DATA STRUCTURE | bit | Identifier |
|---|---|---|
| digital_copy_control_descriptor () { | | |
|     descriptor_tag | 8 | unimsbf |
|     descriptor_length | 8 | unimsbf |
|     digital_recording_control_data | 2 | bslbf |
|     maximum_bit_rate_flag | 1 | bslbf |
|     component_control_flag | 1 | bslbf |
|     copy_control_type | 2 | bslbf |
|     if(copy_control_type==01\|\|copy_control_type==11){ | | |
|         APS_control_data | 2 | bslbf |
|     } | | |
|     else{ | | |
|         reserved_future_use | 2 | bslbf |
|     } | | |
|     if( maximum_bit_rate_flag == 1 ) { | | |
|         maximum_bit_rate | 8 | unimsbf |
|     } | | |
|     if( component_control_flag ==1 ){ | | |
|         component_control_length | | |
|         for(j=0;j<N;j++){ | | |
|             component_tag | 8 | unimsbf |
|             digital_recording_control_data | 2 | bslbf |
|             maximum_bitrate_flag | 1 | bslbf |
|             reserved_future_use | 1 | bslbf |
|             copy_control_type | 2 | bslbf |
|             if(copy_control_type==01\|\|copy_control_type==11) { | | |
|                 APS_control_data | 2 | bslbf |
|             } | | |
|             else{ | | |
|                 reserved_future_use | 2 | bslbf |
|             } | | |
|             if(maximum_bitrate_flag==1){ | | |
|                 maximum_bitrate | 8 | unimsbf |
|             } | | |
|         } | | |
|     } | | |
| } | | |

Fig. 2

| DATA STRUCTURE | bit | Identifier |
|---|---|---|
| content_availability_descriptor () { | | |
|     descriptor_tag | 8 | unimsbf |
|     descriptor_length | 8 | unimsbf |
|     reserved_future_use | 2 | bslbf |
|     retention_mode | 1 | bslbf |
|     retention_state | 3 | bslbf |
|     encryption_mode | 1 | bslbf |
|     image_constraint_token | 1 | bslbf |
|     for(i=0;i<N;i++){ | | |
|         reserved_future_use | 8 | unimsbf |
|     } | | |
| } | | |

Fig. 3
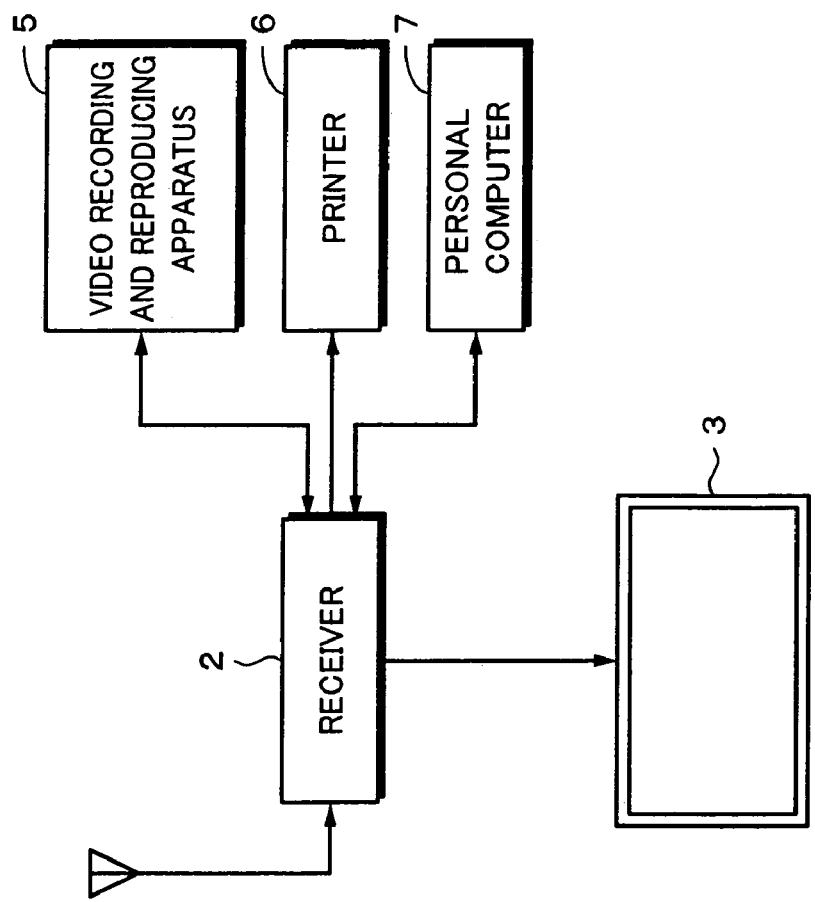
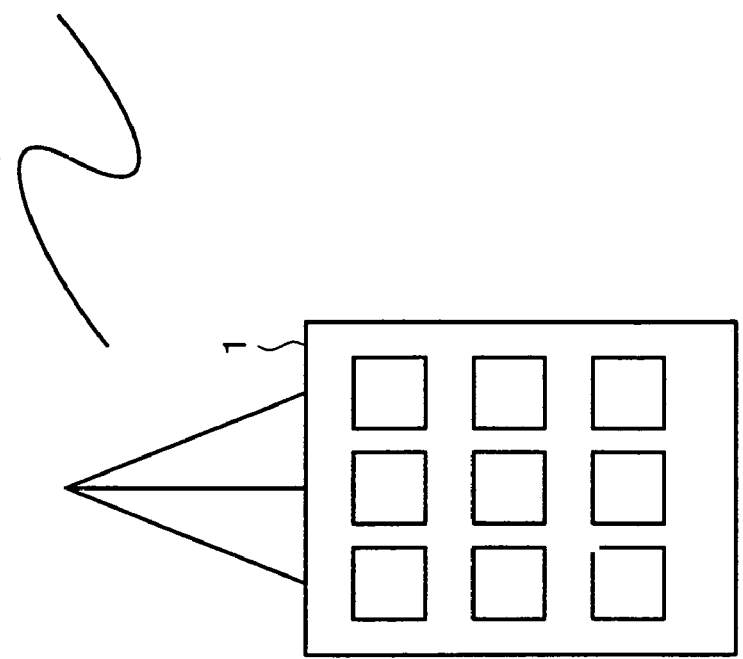

Fig. 5

| DATA STRUCTURE | bit | Identifier |
|---|---|---|
| still_image_copy_control_descriptor () [ | | |
|     descriptor_tag | 8 | unimsbf |
|     descriptor_length | 8 | unimsbf |
|     reserved_future_use | 3 | bslbf |
|     image_resolution_control | 1 | bslbf |
|     recording_control | 1 | bslbf |
|     printing_control | 1 | bslbf |
|     expiration_date_flag | 1 | bslbf |
|     component_flag | 1 | bslbf |
|     if(image_resolution_control==1){ | | |
|         maximum_horizontal_pixel_number | 16 | unimsbf |
|         maximum_vertical_pixel_number | 16 | unimsbf |
|     } | | |
|     if(recording_control==1){ | | |
|         reserved_future_use | 4 | bslbf |
|         record_prohibited | 1 | bslbf |
|         recording_security | 1 | bslbf |
|         print_prohibited | 1 | bslbf |
|         recording_constrain_bit | 1 | bslbf |
|         number_of_record | 8 | unimsbf |
|     } | | |
|     if(printing_control==1){ | | |
|         print_prohibited | 1 | bslbf |
|         print_constraint_bit | 1 | bslbf |
|         number_of_print | 6 | unimsbf |
|     } | | |
|     if(expiration_date_flag==1){ | | |
|         expiration_date | 40 | bslbf |
|     } | | |
|     if(component_flag==1){ | | |
|         component_tag | 8 | unimsbf |
|     } | | |
|     for(i=0;i<N;i++){ | | |
|         reserved_future_use | 8 | unimsbf |
|     } | | |
| } | | |

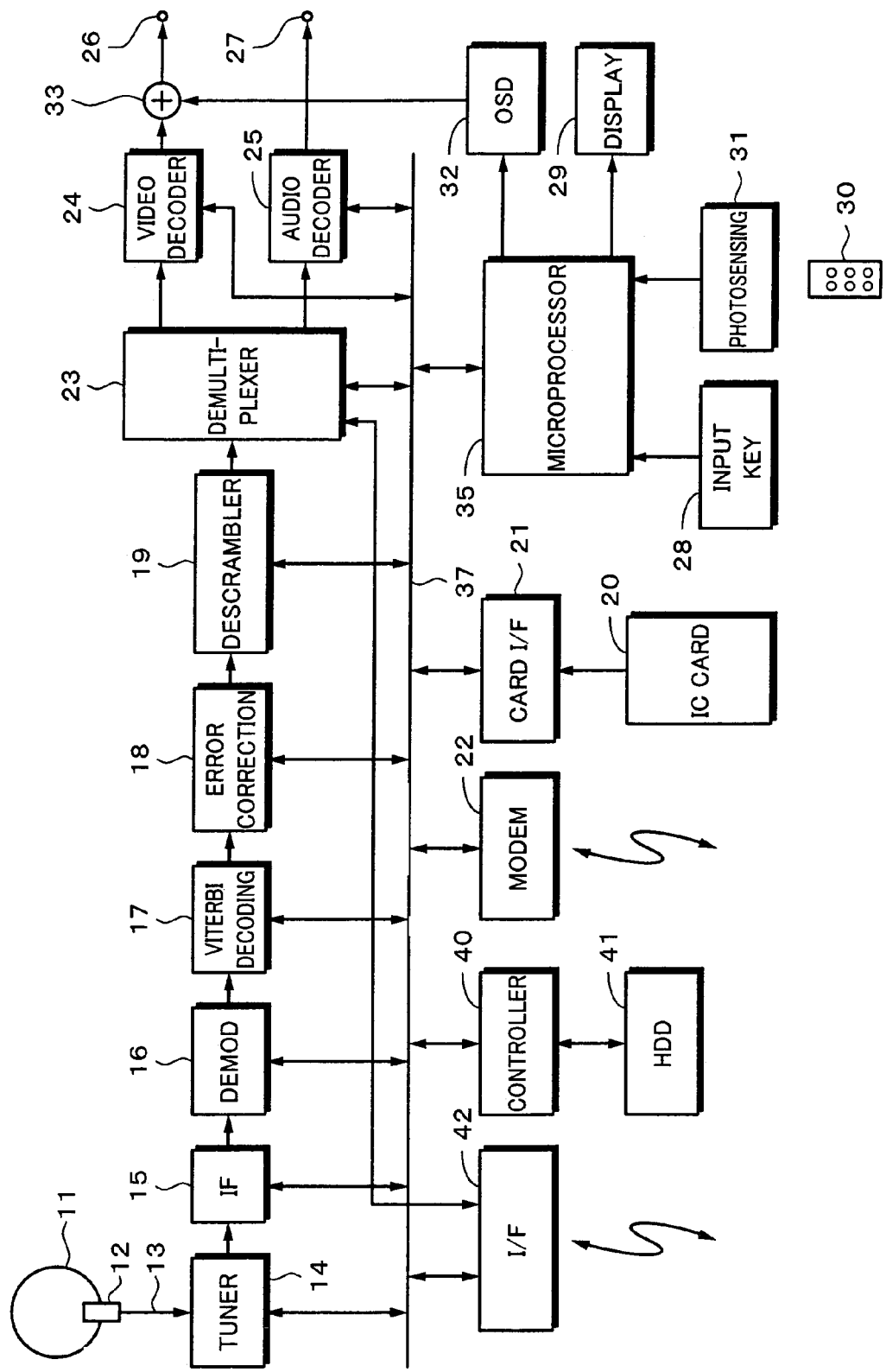

Fig. 7

| DATA STRUCTURE | bit | Identifier |
|---|---|---|
| program_map_section(){ | | |
|     table_id | 8 | unimsbf |
|     section_syntax_indicator | 1 | bslbf |
|     '0' | 1 | bslbf |
|     reserved | 2 | bslbf |
|     section_length | 12 | unimsbf |
|     program_number | 16 | unimsbf |
|     reserved | 2 | bslbf |
|     version_number | 5 | unimsbf |
|     current_next_indicator | 1 | bslbf |
|     section_number | 8 | unimsbf |
|     last_section_number | 8 | unimsbf |
|     reserved | 3 | bslbf |
|     PCR_PID | 13 | unimsbf |
|     reserved | 4 | bslbf |
|     program_info_length | 12 | unimsbf |
|     for(i=0;i<N;i++){ | | |
|         descriptor() | | |
|     } | | |
|     for(i=0;i<N;++){ | | |
|         stream_type | 8 | unimsbf |
|         reserved | 3 | bslbf |
|         elementary_PID | 13 | unimsbf |
|         reserved | 4 | bslbf |
|         ES info length | 12 | unimsbf |
|         for(j=0;j<N;j++){ | | |
|             descriptor() | | |
|         } | | |
|     } | | |
|     CRC_32 | 32 | rpchof |
| } | | |

Fig. 8

| DATA STRUCTURE | bit | Identifier |
|---|---|---|
| event_information_section(){ | | |
|     table_id | 8 | unimsbf |
|     section_syntax_indicator | 1 | bslbf |
|     reserved_future_use | 1 | bslbf |
|     reserved | 2 | bslbf |
|     section_length | 12 | unimsbf |
|     service_id | 16 | unimsbf |
|     reserved | 2 | bslbf |
|     version_number | 5 | unimsbf |
|     current_next_indicator | 1 | bslbf |
|     section_number | 8 | unimsbf |
|     last_section_number | 8 | unimsbf |
|     transport_stream_id | 16 | unimsbf |
|     original_network_id | 16 | unimsbf |
|     segment_last_section_number | 8 | unimsbf |
|     last_table_id | 8 | unimsbf |
|     for(i=0;i<N;i++){ | | |
|         event_id | 16 | unimsbf |
|         start_time | 40 | bslbf |
|         duration | 24 | unimsbf |
|         running_status | 3 | unimsbf |
|         free_CA_mode | 1 | bslbf |
|         description_loop_length | 12 | unimsbf |
|         for(j=0;j<M;j++){ | | |
|             description() | | |
|         } | | |
|     } | | |
|     CRC_32 | 32 | rpchof |
| } | | |

Fig. 9

| DATA STRUCTURE | bit | Identifier |
|---|---|---|
| service_description_section(){ | | |
|     table_id | 8 | unimsbf |
|     section_syntax_indicator | 1 | bslbf |
|     reserved_future_use | 1 | bslbf |
|     reserved | 2 | bslbf |
|     section_length | 12 | unimsbf |
|     transport_stream_id | 16 | unimsbf |
|     reserved | 2 | bslbf |
|     version_number | 5 | unimsbf |
|     current_next_indicator | 1 | bslbf |
|     section_number | 8 | unimsbf |
|     last_section_number | 8 | unimsbf |
|     original_network_id | 16 | unimsbf |
|     reserved_future_use | 8 | bslbf |
|     for (i = 0;i< N;i++) { | | |
|         service_id | 16 | unimsbf |
|         reserved_future_use | 6 | bslbf |
|         EIT_schedule_flag | 1 | bslbf |
|         EIT_present_following_flag | 1 | bslbf |
|         running_status | 3 | unimsbf |
|         free_CA_mode | 1 | bslbf |
|         descriptors_loop_length | 12 | unimsbf |
|         for (j = 0;j< M;j++) { | | |
|             descriptor() | | |
|         } | | |
|     } | | |
|     CRC_32 | 32 | rpchof |
| } | | |

METHOD AND APPARATUS FOR PROTECTING BROADCAST DATA

TECHNICAL FIELD

The invention relates to a digital broadcasting system, using an MPEG (Moving Picture Coding Experts Group) 2 system, a receiving apparatus, and a protecting method and a receiving method of broadcast data and, more particularly, to protection of a copyright of a still image.

BACKGROUND ART

An MPEG2 system (ISO/IEC 13818-1 GENERIC CODING OF MOVING PICTURES AND ASSOCIATED AUDIO: SYSTEMS Recommendation H.222.0) is used in a digital broadcast (digital satellite broadcast, digital terrestrial broadcast, and digital CATV (Cable Television)) in Japan. Such a system has been formed on the basis of the standard of ARIB (Association of Radio Industrial and Businesses).

The MPEG2 system specifies a system for multiplexing each of individual streams such as encoded video data, audio data, additional data, and the like and reproducing while synchronizing them. There are two kinds of systems such as MPEG2-PS (Program Stream) and MPEG2-TS (Transport Stream).

Since the MPEG2-PS has been made by presuming an application to transmission and storage of data in an environment where no errors occur and redundancy can be reduced, it is used in a digital storage media such as a DVD (Digital Versatile Disc) or the like using a powerful error correction code.

Since the MPEG2-TS has been made by presuming an application to an environment such as broadcast, communication network, or the like where a transmission error of data occurs and a plurality of programs can be constructed in one stream, it is used in a digital broadcast or the like.

In the MPEG2-TS, a plurality of TS (Transport Stream) packets of a fixed length of 188 bytes are collected and the transport stream is formed. The length of TS packet of 188 bytes has been determined in consideration of matching performance with an ATM (Asynchronous Transfer Mode) cell length.

The TS packet is constructed by a packet header of a fixed length of 4 bytes and an adaptation field and a payload each having a variable length. A PID (packet identifier) and various flags are defined in the packet header. A kind of TS packet is identified by the PID.

A PES (Packetized Elementary Stream) packet in which the individual streams of video, audio, and the like have been enclosed is divided into a plurality of TS packets having the same PID number and transmitted. For example, the MPEG2 system is used for encoding the video data. For example, in a BS (Broadcast Satellite) digital broadcast, an MPEG2-AAC (MPEG2 Advanced Audio Coding) system is used for encoding the audio data.

A PES packet in which data such as subtitles or the like is enclosed is also divided into a plurality of TS packets and transmitted in a manner similar to the packet of the video data or audio data.

Further, a packet of information described by a table in a section format such as PSI (Program Specific Information) or SI (Service Information) is included in the transport stream. The PSI is information which is necessary in a system which selectively receives a desired broadcast channel. A PAT (Program Association Table), a PMT (Program Map Table), an NIT (Network Information Table), a CAT (Condition Access Table), and the like can be given as PSI.

The PID or the like of the PMT corresponding to the program number is described in the PAT. A video image, an audio sound, and additional data included in the corresponding program and a PID of a PCR are described in the PMT. Detailed information regarding the whole broadcasting system is described in the NIT. For example, information of all programs included in a network and information showing at which carrier frequency a target program is transmitted are described. Information regarding identification of a limited receiving system and the individual information such as contract information and the like is described in the CAT. The SI indicates a section which is used for services of a broadcast industrial company. There are an EIT (Event Information Table) and an SDT (Service Description Table) as SI. Detailed information, a broadcasting time, and the like of the program are described in the EIT. The EIT is used for an EPG (Electronic Program Guide) and a recording reservation.

As a digital broadcast of such an MPEG2 system, a digital CS (Communication Satellite) broadcast and a digital BS (Broadcast Satellite) broadcast have already been started in Japan. In the digital BS broadcast, besides an ordinary SDTV (Standard Definition Television), a broadcast of an HDTV (High Definition Television) is being performed. Execution of a digital terrestrial broadcast is also being examined.

To protect a copyright of a motion image which is transmitted by such a digital broadcast, a digital copy control descriptor (digital_copy_control_descriptor) has been defined in ARIB STD-B10 (refer to FIG. 1). The digital copy control descriptor (digital_copy_control_descriptor) is inserted into the PMT, EIT, and SDT. In the case of copying the motion image which is transmitted by the digital broadcast, copying is restricted by such a descriptor.

Two bits of digital_recording_control_data in the digital copy control descriptor (digital_copy_control_descriptor) are used for copy control. When those two bits are equal to "00", it indicates "Copy Freely" (the copy can be freely performed), "11" indicates "Copy Never" (the copying is inhibited), and "10" indicates "Copy One Generation" (the copy of only one generation is permitted). That is, those two bits are used to make the copy control of a CGMS (Copy Generation Management System). The copy control by the CGMS has been disclosed in, for example, Patent Document (JP-A-2000-123480).

Further, a content availability descriptor (content_availability_descriptor) is defined for the motion image (refer to FIG. 2). In the content availability descriptor (content_availability_descriptor), resolution can be restricted in the case of outputting the stored image or a recording time when a copy-inhibited image is temporarily recorded into a video recording and reproducing apparatus can be restricted.

In the content availability descriptor (content_availability_descriptor), image_constrain_token is used to restrict the resolution in the case of outputting the stored image in an analog manner. retention_mode shows whether to restrict a recording time when the copy-inhibited image is temporarily recorded or not. retention_state shows a recording restricting time when the copy-inhibited image is temporarily recorded. When retention_mode is equal to "0", the image can be temporarily stored only for the time shown by retention_state. encryption_mode shows whether to encrypt the data of contents and output it from a high-speed digital terminal or not.

In recent years, the video recording and reproducing apparatus using an HDD (Hard Disk Drive) has been proposed. The video recording and reproducing apparatus using the HDD has a function to store the motion image which is being received, and when the user has a visitor or the like, freeze a receiving display screen and when the visitor has left, follow-up reproduce the motion image recorded in the HDD from the frozen position. retention_state of the content availability descriptor (content_availability_descriptor) is effective, particularly, in the case where copy restriction of copy-inhibited contents is made in the video recording and reproducing apparatus having such a function.

As mentioned above, the protection of the copyright of the motion image is realized by inserting the digital copy control descriptor (digital_copy_control_descriptor) or the content availability descriptor (content_availability_descriptor) into the PMT.

However, a system which transmits copyright information of a still image in the broadcast does not exist. Therefore, a violation act of a copyright law is still performed. The still image has rights such as copyright, right of portrait, and the like and it is demanded to establish a system which transmits and manages the copyright information of the still image contents.

As a still image with a possibility of being illegally used, there are a still image obtained by freezing the motion image and extracting a part of the motion image and a still image which is transmitted by a data broadcast service.

That is, the motion image is fundamentally a continuation of still images. In the digital broadcast, there are the following video formats: 1080i (1920×1080, interlaced scan); 480p (720×480, progressive scan); 480i (720×480, interlaced scan); 720p (1280×720, progressive scan); (1080p 1920× 1080, progressive scan); and the like. The still image is obtained by freeze-reproducing the motion image. In the case of a signal of the video format such as 1080i, 1080p, or 720p, the still image obtained by freezing the motion image also has a fairly high picture quality.

The data broadcast service can be executed in the digital broadcast. In the data broadcast service, multimedia contents such as motion image, still image, characters, figure, subtitles, and the like can be handled. By using a browser, those multimedia contents can be linked and viewed. The still image encoded by a JPEG (Joint Photographic Experts Group) system or the like is derived from the data broadcast service.

As mentioned above, also with respect to the still image extracted as a part of the motion image or the still image which is transmitted by the data broadcast service, it is necessary to protect the copyright and prevent the still image from being illegally copied, illegally printed, or illegally attached to a homepage or the like.

DISCLOSURE OF INVENTION

It is, therefore, an object of the invention to provide a broadcasting system and a receiving apparatus which can protect a copyright of a still image which is transmitted by a digital broadcast and to provide a protecting method and a receiving method of broadcast data.

The invention provides a broadcasting system comprising: a transmitting apparatus for transmitting a digital broadcast by a stream of an MPEG system; and a receiving apparatus for receiving the stream transmitted from the transmitting apparatus, wherein the transmitting apparatus allows copyright information of a still image to be included in a predetermined table in the stream and transmits the obtained stream and the receiving apparatus refers to the copyright information of the still image in the predetermined table in the stream transmitted from the transmitting apparatus and executes a copyright protecting process of the still image on the basis of the copyright information of the still image in the predetermined table.

The invention provides a broadcasting system comprising: a transmitting apparatus for transmitting a digital broadcast by a stream of an MPEG system; and a receiving apparatus for receiving the stream transmitted from the transmitting apparatus, wherein the transmitting apparatus allows copyright information of a still image t be included in a predetermined table in the stream and transmits the obtained stream and the receiving apparatus refers to the copyright information of the still image in the predetermined table in the stream transmitted from the transmitting apparatus and executes a copyright protecting process of the still image upon reservation on the basis of the copyright information of the still image in the predetermined table.

The invention provides a receiving apparatus comprising: receiving means for receiving a signal of a digital broadcast transmitted by a stream of an MPEG system; means for decoding information in a predetermined table from the received stream and obtaining copyright information of a still image from the predetermined table; and means for referring to the copyright information of the still image in the predetermined table in the stream and executing a copyright protecting process of the still image on the basis of the copyright information of the still image in the predetermined table.

The invention provides a receiving apparatus comprising: receiving means for receiving a signal of a digital broadcast transmitted by a stream of an MPEG system; means for decoding information in a predetermined table from the received stream and obtaining copyright information of a still image from the predetermined table; and means for referring to the copyright information of the still image in the predetermined table in the stream and executing a copyright protecting process of the still image upon reservation on the basis of the copyright information of the still image in the predetermined table.

The invention provides a protecting method of broadcast data, comprising the steps of: allowing copyright information of a still image to be included in a predetermined table in a stream of an MPEG system and transmitting the obtained stream; receiving the transmitted stream of the MPEG system; and referring to the copyright information of the still image in the predetermined table in the received stream and executing a copyright protecting process of the still image on the basis of the copyright information of the still image in the predetermined table.

The invention provides a protecting method of broadcast data, comprising the steps of: allowing copyright information of a still image to be included in a predetermined table in a stream of an MPEG system and transmitting the obtained stream; receiving the transmitted stream of the MPEG system; and referring to the copyright information of the still image in the predetermined table in the received stream and executing a copyright protecting process of the still image upon reservation on the basis of the copyright information of the still image in the predetermined table.

The invention provides a receiving method comprising the steps of: receiving a signal of a digital broadcast transmitted by a stream of an MPEG system; decoding information in a predetermined table from the received stream and obtaining copyright information of a still image from the predetermined table; and referring to the copyright information of the still image in the predetermined table in the stream and executing a copyright protecting process of the still image on the basis of the copyright information of the still image in the predetermined table.

The invention provides a receiving method comprising the steps of: receiving a signal of a digital broadcast transmitted by a stream of an MPEG system; decoding information in a predetermined table from a received stream and obtaining copyright information of a still image from the predetermined table; and referring to the copyright information of the still image in the predetermined table in the stream and executing a copyright protecting process of the still image upon reservation on the basis of the copyright information of the still image in the predetermined table.

When it is necessary to protect the copyright of the contents data which is broadcasted, the digital copy control descriptor (digital_copy_control_descriptor), the content availability descriptor (content_availability_descriptor), and a still image copy control descriptor (still image_copy_control_descriptor) are described on the basis of it. By using the still image copy control descriptor (still_image_copy_control_descriptor) as well as the digital copy control descriptor (digital_copy_control_descriptor) and the content availability descriptor (content_availability_descriptor), the copyright can be protected with respect to not only the motion image but also the still image.

By using the still image copy control descriptor (still_image_copy_control_descriptor), the operation of the receiver can be finely described by the copyright information of the still image in the digital broadcast and the copyright information. Fine control of printing in the receiver of the contents of the digital broadcast can be made. Fine control of recording to a recording medium in the receiver of the contents of the digital broadcast can be made.

According to the invention, when the still image copy control descriptor (still_image_copy_control_descriptor) cannot be referred to, the copy control descriptor of the still image is set by the digital copy control descriptor (digital_copy_control_descriptor) of the motion image with reference to the digital copy control descriptor (digital_copy_control_descriptor). Thus, a burden on the transmitting side of the digital broadcast can be reduced.

According to the invention, in the case where the still image copy control descriptor (still_image_copy_control_descriptor) and the digital copy control descriptor of the motion image cannot be referred to, when the copyright information is not sent, the copy control descriptor of the still image is set on the basis of the predetermined copyright information of the still image. Thus, the burden on the transmitting side of the digital broadcast can be reduced.

When the program is reserved, the copyright of the still image can be protected by inserting the still image copy control descriptor (still_image_copy_control_descriptor) into the EIT and/or the SDT.

BRIEF DESCRIPTION OF DRAWINGS

FIG. 1 is a schematic diagram showing a structure of a digital copy control descriptor.

FIG. 2 is a schematic diagram showing a structure of a content availability descriptor.

FIG. 3 is a block diagram showing an outline of a broadcasting system to which the invention is applied.

FIG. 5 is a schematic diagram showing a structure of a still image copy control descriptor.

FIG. 6 is a block diagram of an example of a receiver to which the invention can be applied.

FIG. 7 is a schematic diagram showing a construction of a PMT.

FIG. 8 is a schematic diagram showing a construction of an EIT.

FIG. 9 is a schematic diagram showing a construction of an SDT.

BEST MODE FOR CARRYING OUT THE INVENTION

An embodiment of the invention will be described hereinbelow with reference to the drawings. FIG. 3 shows an example of a receiving system of a digital satellite broadcast to which the invention is applied.

In FIG. 3, a signal of the digital broadcast is transmitted from a broadcasting station 1. The digital broadcast signal is used to broadcast a video image, an audio sound, and data by a system of the MPEG2-TS. A digital satellite broadcast, a digital terrestrial broadcast, a digital CATV, and the like can be given as digital broadcasts. The invention can be also applied to the case of an arbitrary broadcasting format so long as digital broadcast is performed by the MPEG2-TS system.

Figure 4A:
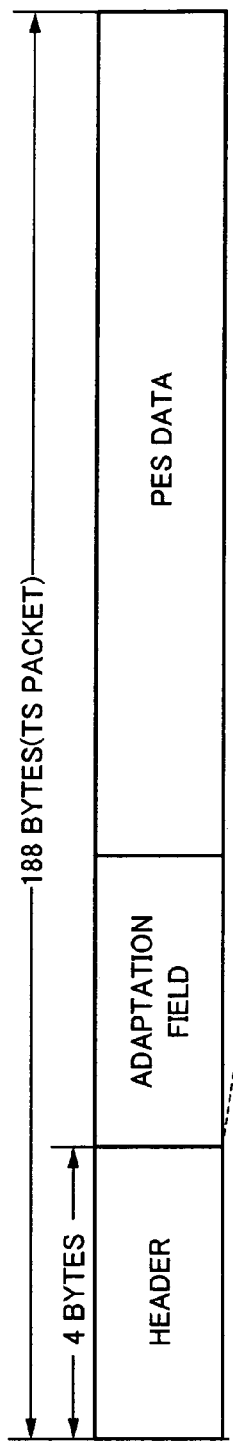
FIG. 4 is a schematic diagram for use in explanation of a transport stream.

In the MPEG2-TS, as shown in FIG. 4A, a TS packet is constructed by 188 bytes is used. The TS packet is constructed by a header of 4 bytes and a payload of 184 bytes.

Figure 4B:
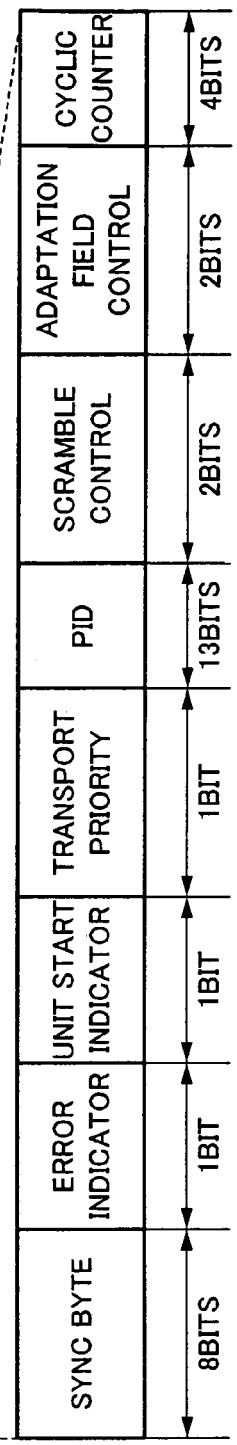

As shown in FIG. 4B, a sync byte (sync_byte) of 8 bits showing the head of the packet is provided at the head of the header. Subsequently, there are provided: an error indicator (transport_error_indicator) of 1 bit showing the presence or absence of an error in the packet; a unit start indicator (payload_unit_start_indicator) of 1 bit showing that a new PES packet starts from the payload of this transport packet; a transport priority (transport_priority) of 1 bit showing significance of this packet; a PID (packet_ID) of 13 bits for identifying the individual packet; scramble control (transport_scramble_control) of 2 bits showing the presence or absence of the scrambling of the payload; adaptation field control (adaptation_field_control) of 2 bits showing the presence or absence of an adaptation field and the presence or absence of the scramble of the payload; and a cyclic counter (continuity_counter) of 4 bits for detecting whether or not a part of the packets each having the PID has been abandoned halfway by checking continuity of a reception counter.

The adaptation field is provided to transmit additional information regarding the individual stream. The adaptation field is constructed by: an adaptation field length; a discontinuity display; a random access display; a stream priority display; a flag for an optional field; the optional field; and a stuffing byte.

Besides the packets of the video, audio, and data such as subtitles or the like, packets of information described by a table in a section format such as PSI or SI are included in the transport stream.

Information necessary for the system, such as information showing that a desired broadcast channel is selected and received or the like has been described in the PSI.

An NIT (Network Information Table), a PAT (Program Association Table), a PMT (Program Map Table), a CAT (Condition Access Table), and the like can be given as PSI.

In the NIT, the same contents have been multiplexed to all carriers. Transmission specifications (a plane of polarization, a carrier frequency, a convolution rate, etc.) of each carrier and a list of channels multiplexed there are described in the NIT. The PID of the packet of the section of the NIT is set to (PID=0x0010).

Information of the peculiar contents is described in the PAT every carrier. Channel information in each carrier and the PID of the PMT showing the contents of each channel are described in the PAT. The PID of the packet of the section of this PMT is set to (PID=0x0000).

A component constructing each channel and the PID of the ECM packet or the like necessary for descrambling are described in the PMT (Program Map Table). The PID of the packet of the section of this PMT is designated by the PAT.

The PIDs of the packets or the like of an ECM and an EMM are described in the CAT (Condition Access Table). The PID of the packet of the section of the CAT is set to (PID=0x0001).

An EIT (Event Information Table) and an SDT (Service Description Table) can be given as SI. Detailed information, a scheduled broadcasting time, and the like of the program are described in the EIT. The EIT is used for an EPG (Electronic Program Guide) and a recording reservation. The PID of the packet of the section of the EIT is set to (PID=0x0012).

The signal transmitted from the broadcasting station 1 in FIG. 3 is received by a receiver 2 in each home. In the receiver 2 in each home, the TS packet is demodulated from the reception signal. The video PES packet and the audio PES packet are extracted from the TS packet. The video signal and the audio signal are decoded from the video PES packet and the audio PES packet. The data packet is extracted from this reception signal and the data packet is decoded.

The video signal and the audio signal decoded in the receiver 2 are supplied to a television receiver 3 as a monitor. A display picture based on the video signal is reproduced by the television receiver 3 and its reproduction sound is outputted. The data broadcast is browsed on the television receiver 3 by using a browser.

Although the receiver 2 of the digital broadcast and the television receiver 3 are separately illustrated here, there is also a case where the receiver of the digital broadcast is built in the television receiver.

Among the receivers 2, there are a receiver having therein a video recording and reproducing function such as digital VCR (Video Cassette Recorder), HDD (Hard Disk Drive), and the like and a receiver having therein a printer. In the case where a video recording and reproducing apparatus is built in the receiver, an image and an audio sound received by a satellite broadcasting tuner can be recorded and reproduced. In the case where a printer is built in the receiver, a desired still image can be printed.

As a receiver 2, there is a receiver to which various apparatuses can be externally connected. For example, a video recording and reproducing apparatus 5 can be connected to the receiver 2. As a video recording and reproducing apparatus 5, there is a video recording and reproducing apparatus using the digital VCR (Video Cassette Recorder) or the HDD (Hard Disk Drive) or the like. It is possible to connect a printer 6 to the receiver 2, extract a still image from a motion image which is being broadcasted, and print the still image. Further, a personal computer 7 can be connected to the receiver 2. In addition, various peripheral devices can be connected to the receiver 2.

When the video recording and reproducing apparatus 5 is connected to the receiver 2, the motion image transmitted by the broadcast can be recorded by the video recording and reproducing apparatus 5. It is also possible to freeze the motion image recorded in the video recording and reproducing apparatus 5, extract the still image, and record the still image.

When the printer 6 is connected to the receiver 2, a desired still image can be printed.

When the personal computer 7 is connected to the receiver 2, by transmitting the data demodulated by the receiver 2 to the personal computer 7, the motion image transmitted by the broadcast or the multimedia data sent by the data broadcast can be recorded onto an HDD of the personal computer 7. The motion image recorded on the HDD of the personal computer 7 can be edited or modified or the still image can be fetched. It is also considered to attach the still image fetched by the personal computer 7 onto a homepage of the user and use it. The still image fetched by the personal computer 7 can be also copied into a recording medium such as CD-R (Compact Disc Recordable), flash memory card, or the like.

As mentioned above, the motion image transmitted by the broadcast can be recorded by the built-in video recording and reproducing apparatus or by the various video recording and reproducing apparatuses which are externally connected. The still image obtained by freezing and fetching the motion image transmitted by the broadcast or the still image transmitted by the broadcast can be recorded by the built-in video recording and reproducing apparatus or by the various video recording and reproducing apparatuses which are externally connected or the still image can be printed. However, if the motion image or the still image transmitted by the broadcast is freely copied, the copyright of the author is not protected. If the still image transmitted by the broadcast is freely printed or attached to the homepage of the user, the copyright of the author is not protected.

In this example, therefore, the digital copy control descriptor (digital_copy_control_descriptor) and the content availability descriptor (content_availability_descriptor) are used for the copyright protection of the motion image. The still image copy control descriptor (still_image_copy_control_descriptor) is used for the copyright protection of the still image.

In the digital copy control descriptor (digital_copy_control_descriptor), as shown in FIG. 1, two bits of digital_recording_control_data are used for the copy control. When those two bits are equal to "00", it indicates "Copy Freely" (the copy can be freely performed), "11" indicates "Copy Never" (the copying is inhibited), and "10" indicates "Copy One Generation" (the copy of only one generation is permitted). As shown in FIG. 2, the content availability descriptor (content_availability_descriptor) includes: image_constrain_ token for restricting the resolution in the case of outputting the motion image in an analog manner; retention_mode showing whether to restrict the recording time when the copy-inhibited motion image is temporarily recorded or not; and retention_state for restricting the recording time when such a motion image is temporarily recorded.

As shown in FIG. 5, the still image copy control descriptor (still_image_copy_control_descriptor) includes: a flag (image_resolution_control, recording_control, print_control, expration_flag) to validate each control; and control to each flag, that is, (maximum_horizontal_pixel_number, maximum_vertical_pixel_number) for restricting the output resolution (the number of pixels) of the still image, (record_prohibited, recording_security, print_prohibited, recording_constrain_bit, number_of_recording) for restricting the recording, (print_prohibited, print_constraint_bit, number_of_print) for restricting the print-out, and expiration_date for restricting the recording time when the image is temporarily recorded. component_flag and component_tag are also provided to describe in the EIT and the SDT. The still image copy control descriptor (still_image_copy_control_descriptor) will be described in detail hereinafter.

The signal of the digital broadcast by the MPEG2-TS is transmitted from the broadcasting station 1 in FIG. 3. As mentioned above, besides the packets of the video, audio, and data such as subtitles or the like, the packets of the information described by the table in the section format such as PSI or SI are included in the stream of the MPEG2-TS.

If it is necessary to protect the copyright when the broadcast is transmitted from the broadcasting station 1, the digital copy control descriptor (digital_copy_control_descriptor), the content availability descriptor (content_availability_descriptor), and a still image copy control descriptor (still_image_copy_control_descriptor) are described on the basis of it.

That is, with respect to the motion image, whether the copy mode is "Copy Freely", "Copy Never", or "Copy One Generation" is confirmed. On the basis of it, the digital copy control descriptor (digital_copy_control_descriptor) is described. The digital copy control descriptor (digital_copy_control_descriptor) is included in the PMT. image_constrain_ token is described of the content availability descriptor (content_availability_descriptor) is described in accordance with the resolution in the case of outputting the stored image in an analog manner. retention_mode and retention_state are described in accordance with the restriction of the recording time when the recording inhibited motion image is temporarily recorded. encryption_mode is described in accordance with whether or not the contents is encrypted in the case of digitally outputting it. The content availability descriptor (content_availability_descriptor) is included in the PMT. To send the copyright information upon reservation of the program, the digital copy control descriptor (digital_copy_control_descriptor) is included in the EIT or the SDT.

With respect to the still image, image_resolution_control, maximum_horizontal_pixel_number, and maximum_vertical_pixel_number are described in accordance with the restriction of the resolution in the case of outputting the image. recording_control, record_prohibited, recording_security, print_prohibited, recording_constrain_bit, and number_of_recording are described in accordance with the restriction of the recording. print_control, print_prohibited, print_constraint_bit, and number_of_print are described in accordance with the restriction of the printing. expiration_flag and expiration_date are described in accordance with the restriction of the recording time when the image is temporarily recorded. The still image copy control descriptor (still_image_copy_control_descriptor) is included in the PMT. To send the copyright information upon program reservation, the still image copy control descriptor (still_image_copy_control_descriptor) is included in the EIT and the SDT. When the still image copy control descriptor (still_image_copy_control_descriptor) is included in the EIT and the SDT, the copyright information of the contents of the whole program is designated and an ES (Elementary Stream) to perform the copyright protection by using component_flag and component_tag is designated.

In the receiver 2, when the motion image transmitted from the broadcasting station 1 is recorded by the built-in or externally-connected video recording and reproducing apparatus, the digital copy control descriptor (digital_copy_control_descriptor) and the content availability descriptor (content_availability_descriptor) which were sent by the PMT are discriminated. On the basis of the description of the digital copy control descriptor (digital_copy_control_descriptor) and the content availability descriptor (content_availability_descriptor), the restriction of the copy, the resolution, the time in the case of temporarily recording the copy-inhibited contents onto the recording medium, and whether or not the output data to the high-speed digital terminal is encrypted and outputted are controlled.

When the still image extracted from the motion image sent by the broadcast or the still image sent by the data broadcast is recorded by the built-in video recording and reproducing apparatus or by the various externally-connected video recording and reproducing apparatuses or when the still image is printed, the resolution in the case of outputting the image, the recording, the printing, and the recording time when the image is temporarily recorded are restricted in accordance with the still image copy control descriptor (still_image_copy_control_descriptor) sent by the PMT.

When the program is reserved, the reservation is restricted in accordance with the digital copy control descriptor (digital_copy_control_descriptor) and the still image copy control descriptor (still_image_copy_control_descriptor) sent by the EIT and the SDT.

As mentioned above, when the broadcast is transmitted from the broadcasting station 1, if it is necessary to protect the copyright, the digital copy control descriptor (digital_copy_control_descriptor), the content availability descriptor (content_availability_descriptor), and the still image copy control descriptor (still_image_copy_control_descriptor) are described on the basis of it. By using not only the digital copy control descriptor (digital_copy_control_descriptor) and the content availability descriptor (content_availability_descriptor) but also the still image copy control descriptor (still_image_copy_control_descriptor), the copyright of not only the motion image but also the still image can be protected.

FIG. 6 shows a specific construction of the receiver to which the invention can be applied. This example is used to receive the digital BS broadcast.

In FIG. 3, a radio wave of the digital satellite broadcast which is transmitted by a radio wave of a band of, for example, 12 GHz through a satellite is received by a parabolic antenna 11 and converted into a first intermediate frequency signal of a band of, for example, 1 GHz by an LNB (Low Noise Block Down Converter) 12 attached to the parabolic antenna 11. An output of the LNB 12 is supplied to a tuner circuit 14 through a cable 13.

A station selection signal is supplied to the tuner circuit 14 from a microprocessor 35.

On the basis of the station selection signal from the microprocessor 35, the signal of a desired carrier frequency is selected from the reception signal by the tuner circuit 14 and the signal of the selected carrier frequency in the reception signal is converted into a second intermediate frequency signal.

The intermediate frequency signal from the tuner circuit 14 is supplied to an IF (Intermediate Frequency) circuit 15. The intermediate frequency signal from the tuner circuit 14 is amplified by the IF circuit 15. An output of the IF circuit 15 is supplied to a demodulating circuit 16.

In the demodulating circuit 16, demodulating processes of a BPSK (Binary Phase Shift Keying), a QPSK (Quadrature Phase Shift Keying), and an 8PSK (8-phase PSK) can be executed.

That is, in the digital BS broadcast, layered transmission is performed by the BPSK, QPSK, and 8PSK. In 8PSK modulation, although an information amount per symbol increases, if the radio wave is attenuated by a rainfall, an error rate deteriorates. On the other hand, according to the BPSK or QPSK, although the information amount per symbol is small, even if the radio wave is attenuated by the rainfall, the error rate does not deteriorate so much.

On the transmitting side, a plurality of TS packets are made to correspond to one slot and each TS packet is mapped to a frame constructed by 48 slots. A modulating system or an encoding system can be allocated to each slot. A kind of modulating system and an encoding ratio allocated to each slot are sent by a TMCC (Transmission and Multiplexing Configuration Control) signal. A superframe is constructed on a unit basis of 8 frames and interleaving is executed every position of the slot.

The transport stream is demodulated by the demodulating circuit 16. An output of the demodulating circuit 16 is supplied to a Viterbi decoding circuit 17. An error correcting process of an inner code is executed in the Viterbi decoding circuit 17. An output of the Viterbi decoding circuit 17 is supplied to an error correction circuit 18. An error correcting process of an outer code is executed in the error correction circuit 18.

That is, in the digital BS broadcast, as an error correction encoding system, a Reed Solomon code (204, 188) is used for the outer code and a trellis code or a convolution code is used for the inner code. The error correcting process of the inner code is executed by the Viterbi decoding circuit 17. The error correcting process of the outer code is executed by the error correction circuit 18 using the Reed Solomon code.

An output of the error correction circuit 18 is supplied to a descrambler 19. CAS (Condition Access System) control is made by the descrambler 19.

That is, in the case of the limited reception, the transport stream has been encrypted. Personal information has been stored in an IC card 20. The IC card 20 is attached through a card interface 21.

Information of sections of an ECM (Encryption Control Message) and an EMM (Entitlement Management Message) which were received and information to descramble the scramble are supplied to the descrambler 19. In the case of the limited reception, descrambling is executed by the descrambler 19 by using the received ECM and EMM and the information in the IC card 20.

A modem 22 is provided. Charge information is sent to a broadcasting center of the program by a telephone line through the modem 22.

The transport stream descrambled by the descrambler 19 is sent to a demultiplexer 23.

The demultiplexer 23 separates the stream of a desired packet from the received transport stream. A packet identifier (PID) is described in a header portion of the packet. In the demultiplexer 23, the packet is separated to the video PES (Packetized Elementary Stream) packet, audio PES packet, data packet, PSI (Program Specific Information) packet, and SI (Service Information) packet of a desired program on the basis of the PID.

The video PES packet of the desired program is sent to a video decoder 24 and the audio PES packet is sent to an audio decoder 25. The stream from the demultiplexer 23 is sent to the microprocessor 35 through a bus 37.

The video decoder 24 receives the video PES packet from the demultiplexer 23, executes a decoding process of the MPEG2 system, and reproduces the video signal. The reproduced video signal is outputted from an output terminal 26.

The audio decoder 25 receives the audio PES packet from the demultiplexer 23, executes a decoding process of the MPEG2-AAC (MPEG2 Advanced Audio Coding), and forms the audio signal. There produced audio signal is outputted from an output terminal 27.

An operation input is given by an input key 28. For example, various keys or switches arranged on a panel of the receiving apparatus are used as an input key 28. The operation input can be executed by an infrared remote controller 30. A photosensing unit 31 for receiving an infrared command signal from the infrared remote controller 30 is provided. A signal from the photosensing unit 31 is sent to the microprocessor 35.

Various setting states are displayed on a display unit 29. For example, a liquid crystal display or an LED (Light Emitting Diode) device which is arranged on the panel can be mentioned as a display unit 29. Further, a display signal from the microprocessor 35 is supplied to an OSD (On Screen Display) circuit 32. An output of the OSD circuit 32 is synthesized to the video signal by an adder 33. Thus, the various setting states can be multiplexed and displayed to the receiving display screen.

An HDD (Hard Disk Drive) 41 for recording and reproducing the received motion image is built in the receiver. The transport stream from the demultiplexer 23 is supplied to the HDD 41 through the bus 37 and an HDD controller 40. This stream is recorded on the HDD 41. Upon reproduction, the stream reproduced from the HDD 41 is sent to the demultiplexer 23 through the HDD controller 40 and the bus 37.

An IEEE (Institute of Electrical and Electronics Engineers) 1394 interface 42 for inputting and outputting the data is provided for the receiver. The transport stream from the demultiplexer 23 can be outputted through the bus 37 and the IEEE 1394 interface 42 or through a signal line connected to the demultiplexer 23. Transport stream transferred from another apparatus through the IEEE 1394 interface 42 can be inputted.

A video recording and reproducing apparatus such as digital VCR, HDD video recording and reproducing apparatus, or the like is connected to the IEEE 1394 interface 42 and the motion image sent by the broadcast can be recorded by the video recording and reproducing apparatus such as digital VCR, HDD video recording and reproducing apparatus, or the like. It is also possible to connect a printer to the IEEE 1394 interface 42, fetch the still image from the motion image which is being broadcasted, and print the still image. Further, it is also possible that a personal computer is connected to the IEEE 1394 interface 42 and the still image extracted from the motion image or the still image sent by the data broadcast is stored in the personal computer or copied into another recording medium such as a memory card or the like.

In the microprocessor 35, when the motion image transmitted from the broadcasting station 1 is recorded by the built-in HDD 41 or the video recording and reproducing apparatus connected to the interface 42, the digital copy control descriptor (digital_copy_control_descriptor) and the content availability descriptor (content_availability_descriptor) sent by the PMT are discriminated. The copyright process such as copy restriction or the like is executed on the basis of the description of the digital copy control descriptor (digital_copy_control_descriptor) and the content availability descriptor (content_availability_descriptor).

When the still image extracted from the motion image sent by the broadcast or the still image sent by the data broadcast is recorded by the built-in HDD 41 or the video recording and reproducing apparatus connected to the interface 42 or the still image is printed by the printer connected to the interface 42, the copyright process such as print restriction, recording restriction, or the like is executed in accordance with the still image copy control descriptor (still_image_copy_control_descriptor) sent by the PMT.

When the program is reserved, the apparatus is notified of the copyright information of the motion image and the still image by the digital copy control descriptor (digital_copy_control_descriptor) and the still image copy control descriptor (still_image_copy_control_descriptor) sent by the EIT and the SDT. The reservation setting process is executed in accordance with the copyright information.

The example of the receiver of the digital BS broadcast has been described here. However, even in the receiver of the digital terrestrial broadcast or the digital CATV, its fundamental construction is similar to that of the above receiver although the modulating system and the error correcting system are different from those of the above receiver. In the case of the digital terrestrial broadcast, an OFDM (Orthogonal Frequency Division Multiplex) is used as a modulating system. In the digital CATV, a multivalue QAM (Quadrature Amplitude Modulation) is used as a modulating system.

The still image copy control descriptor (still_image_copy_control_descriptor) shown in FIG. 5 will now be described in detail. The still image copy control descriptor (still_image_copy_control_descriptor) is described in the PMT, EIT, or SDT. The PMT is constructed as shown in FIG. 7. The EIT is constructed as shown in FIG. 8. The SDT is constructed as shown in FIG. 9.

The still image copy control descriptor (still_image_copy_control_descriptor) can be arranged in a first loop and an ES loop of the PMT.

In the case of arranging the descriptor into the first loop of the PMT, this restriction can be applied to all of the still images included in the designated program. In the case of arranging the descriptor into the ES loop of the PMT, the restriction of the descriptor can be applied only to the still image of the designated ES. It is assumed that in the case where the descriptor is arranged in both of the first loop and the ES loop, with respect only to the designated ES, the restriction of the descriptor of the ES loop is preferentially applied than the descriptor of the first loop. In this case, it is assumed that in the case where no descriptor exists in another ES loop, the restriction of the descriptor of the first loop is applied.

In the case of arranging the still image copy control descriptor (still_image_copy_control_descriptor) to the EIT, it is described in the program information of the EIT.

In the case of arranging the still image copy control descriptor (still_image_copy_control_descriptor) to the SDT, information of the still image copy control descriptor (still_image_copy_control_descriptor) is applied to all programs in the channel.

It is assumed that in the case where the descriptor is arranged in both of the EIT and the SDT, the information of the EIT is applied to the designated program. It is assumed that if there is no descriptor in the EIT and the descriptor is arranged only in the SDT, the information of the descriptor of the SDT is applied to the program.

As shown in FIG. 5, the still image copy control descriptor (still_image_copy_control_descriptor) includes flags (image_resolution_control, recording_control, print_control, expiration_date_flag, component_flag) and control after an if sentence to each of the flags. When "1" is set to the flag, the subsequent if sentence is validated and it is necessary to control the still image in accordance with the condition of the if sentence. component_flag and component_tag are arranged only in the case of arranging the descriptor to the EIT and the SDT.

The image_resolution_control bit is used to restrict the resolution (the number of pixels) of the display. When the image_resolution_control bit is set to "1", it is necessary to restrict the number of pixels to the designated value in all conditions other than those of the display device to which the receiver is connected (the display screen of the television receiver serving as a monitor in the case where the receiver and the television receiver are separate; the display screen of the television receiver in the case where the television having the receiver therein is the receiver). Therefore, in the case of outputting the still image in order to record it by the printer or record it onto a recording medium, it is necessary to restrict the number of pixels to the maximum pixel size defined by the if sentence. When the image_resolution_control bit is set to "0", the if sentence does not appear in the descriptor. If a size of original image is smaller than the designated pixel size, even if such restriction has been designated, there is no need to perform the restriction. The bits are assigned every 16 bits to maximum_horizontal_pixel_number and maximum_vertical_pixel_number of the if sentence. The maximum pixel size to be restricted is described by the hexadecimal notation. For example, if the user wants to set an upper limit of the output image of the still image to the SVGA (Super Video Graphic Array) size, a value of 0x320 is described in maximum_horizontal_pixel_number and a value of 0x0258 is described in maximum_vertical_pixel_number.

In the still image sent by the data broadcast, it is also possible to construct in such a manner that the restriction of the resolution is not applied only to a graphics signal of characters or the like in which there is no need to restrict the resolution.

The recording_control bit is used to restrict the recording to the recording medium. When the recording_control bit is set to "1", in the case of recording the still image onto the recording medium in which the receiver is built or to which the receiver is externally connected, it is necessary to make control in accordance with the bits defined by the if sentence. When the bit is set to "0", the lower if sentence (if(recording_control==0)) does not appear. When the recording_prohibited bit is set to "1", this means that the recording to the recording medium is inhibited. In this case, the subsequent recording_security and print_prohibited bits are invalidated even if they are set to any value.

When "0" is described in the record_prohibited bit, the recording is permitted and the subsequent recording_security and print_prohibited bits are validated.

When the recording_security bit is set to "1", the recording can be executed only in the limited case where a security technique has been implemented in the recording medium. In this case, the recording cannot be executed to a memory device without the security technique. Specifically speaking, there is a memory stick (registered trademark) as a recording medium in which the security technique has been implemented. A memory stick of Magic Gate (registered trademark) in which the security has been implemented and a memory stick (registered trademark) in which the security has not been implemented can be given as a memory stick (registered trademark). When the recording_security bit is set to "0", the security technique is not requested for the recording of the still image.

The next print_prohibited bit is a bit for restricting the print-out of the recorded image. When "1" is written in print_prohibited, the print-out is inhibited. When "0" is written, the printing is permitted. This bit means that when the recording_security bit is set to "1", there is a print-out restriction in the still image recording security technique and the recording is permitted only to the device which can succeed to this bit and record. Therefore, the recording is not permitted to the recording media in which there is not a print-out restriction in the security technique. This bit is validated only when the recording security bit is set to "1".

recording_constrain_bit is a bit showing whether to validate the designation of the number of permitting times of the recording or not. If recording_constrain_bit is set to "1", the recording can be performed only the number of times shown by the number_of_record bits. The number of recording times can be directly defined to 8 bits of the number_of_record bits. For example, if the recording can be performed 10 times, 0×0A is written. If the number of recording times is not restricted, recording_constrain_bit is set to "0" and an area of 8 bits of the subsequent number_of_record bits is invalidated.

When the print_control flag is set to "1", the lower if sentence is validated. When it is set to "0", the lower if sentence (if(print_control==1)) does not appear. When print_prohibited bit in the if sentence is set to "1", it is inhibited to print the still image by the printer which is built in the receiver or the printer which is externally connected to the receiver. Only when this bit is set to "0", the printing is permitted and subsequent print_constraint_bit and the number_of_print bit are validated. When print_constraint_bit is set to "1", this means that a restriction regarding the printing is added. It is inhibited that the printing is executed the number of times larger than the number of times designated in subsequent number_of_print. When this bit is set to "0", the printing can be permitted without limit. number_of_print indicates the limited number of times in the case of printing. For example, 0×02 is written in the case of outputting two prints as a maximum value.

expiration_date_flag is a bit to restrict the term. When expiration_date_flag is set to "1", the lower if sentence is validated. When it is set to "0", the lower if sentence (if (expiration_flag==1)) does not appear. expiration_date of 40 bits in the if sentence is defined by ARIB STD-B10 and is the same definition as that of the Japan Standard Time which is used in JST_Time in a TOT (Time Offset Table). The Japan Standard Time (JST) is defined as "UTC (Universal Time of Convention)+9". When expiration_date is defined, the printing and recording functions are validated until the defined time. When the defined time is expired, the printing and the recording must not be performed. For example, in the case where a data recording media such as an HDD or the like is built in the receiver and the contents can be held, such restriction time is validated. It is assumed that this restriction is succeeded with respect to the recording media in which the restriction time can be designated.

component_flag is a bit to designate the ES. When component_flag is set to "1", the lower if sentence is validated. When it is set to "0", the lower if sentence (if(component flag==1)) does not appear. This flag is not used in the case of arranging the descriptor into the PMT. It is used to designate the ES when the copyright information of the still image is sent to the ES in the case of describing the descriptor into the EIT or SDT for reservation or the like. By inserting the designated value of the ES into comonent_tag, this flag can be used for reservation of the printing or reservation of the recording of the still image.

If the still image copy control descriptor (still_image_copy_control_descriptor) is certainly inserted, the sender of the contents has to insert the digital copy control descriptor (digital_copy_control_descriptor) for the copyright protection of the motion image and the still image copy control descriptor (still_image_copy_control_descriptor) for the copy control of the still image, so that it is considered that such an operation becomes a large burden on the transmitting side of the digital broadcast. To reduce the burden on the transmitting side of the digital broadcast, it is demanded that the copyright of the still image is protected even in the case where the still image copy control descriptor (still_image_copy_control_descriptor) is not arranged in the PMT.

Processes in the case where the still image copy control descriptor (still_image_copy_control_descriptor) is not arranged in the PMT as mentioned above will now be described.

If the still image copy control descriptor (still_image_copy_control_descriptor) is not arranged in the PMT, there are a case where it is defined that the printing and recording functions can be executed without limit and a case where a default value is defined by the copyright information of the digital copy control descriptor (digital_copy_control_descriptor). This selection is defined by the broadcast industrial company. For example, in the case of the BS digital broadcast, a case where the default value is defined by the copyright information of the digital copy control descriptor (digital_copy_control_descriptor) can be selected.

When the still image copy control descriptor (still_image_copy_control_descriptor) is not arranged in the PMT, in the case of defining the default value by the copyright information of the digital copy control descriptor (digital_copy_control_descriptor), it is defined as follows.

For example, when the digital copy control descriptor (digital_copy_control_descriptor) is not arranged in the PMT or in the case where although the digital copy control descriptor has been arranged in the PMT, digital_recording_control_data in the descriptor is equal to "00", the copyright information of the motion image indicates "Copy Freely without any restricting condition". Therefore, also with respect to the printing and the recording of the still image, it is assumed that the wording is changed to a different reading "the printing and the recording can be performed without any restricting condition".

When digital_recording_control_data is equal to a value "10", the copyright information of the motion image indicates "Copy One Generation". Therefore, with respect to the printing, it is defined that only one sheet can be printed (print_prohibited=0, print_constraint_bit=1, number_of_record=000001) and, with respect to the recording, it is defined that the recording is possible only to the recording media in which the security has been defined (record_prohibited=0, recording_security=1, print_prohibited=0, number_of_record=1).

If digital_recording_control_data=11 and the copyright information of the motion image indicates "Copy Never", it is defined that the printing is inhibited (print_prohibited=1) and the recording is inhibited (record_prohibited=1). Also in the case where digital_recording_control_data is equal to an arbitrary value, the wording is changed to a different reading "there is no restriction of image_resolution and expiration_date". Such a wording change to the different reading is one example and the industrial company can set wording change conditions with respect to each of digital_recording_control_data. The setting of the wording change can be also changed not only by the value of digital_copy_control_data of the digital copy control descriptor but also by the values of copy_control_type and API_control_data and the values of image_constraint_token, retention_mode, retention_state, and encryption_mode of the content availability descriptor.

If the case where the still image copy control descriptor (still_image_copy_control_descriptor) does not exist in the PMT, EIT, and SDT, it is substituted by the CGMS of the digital copy control descriptor (digital_copy_control_descriptor). However, it is assumed that, if the still image copy control descriptor (still_image_copy_control_descriptor) and the digital copy control descriptor (digital_copy_control_descriptor) do not exist in the PMT, EIT, and SDT, a default value is set to the still image copy control.

Figure 10:
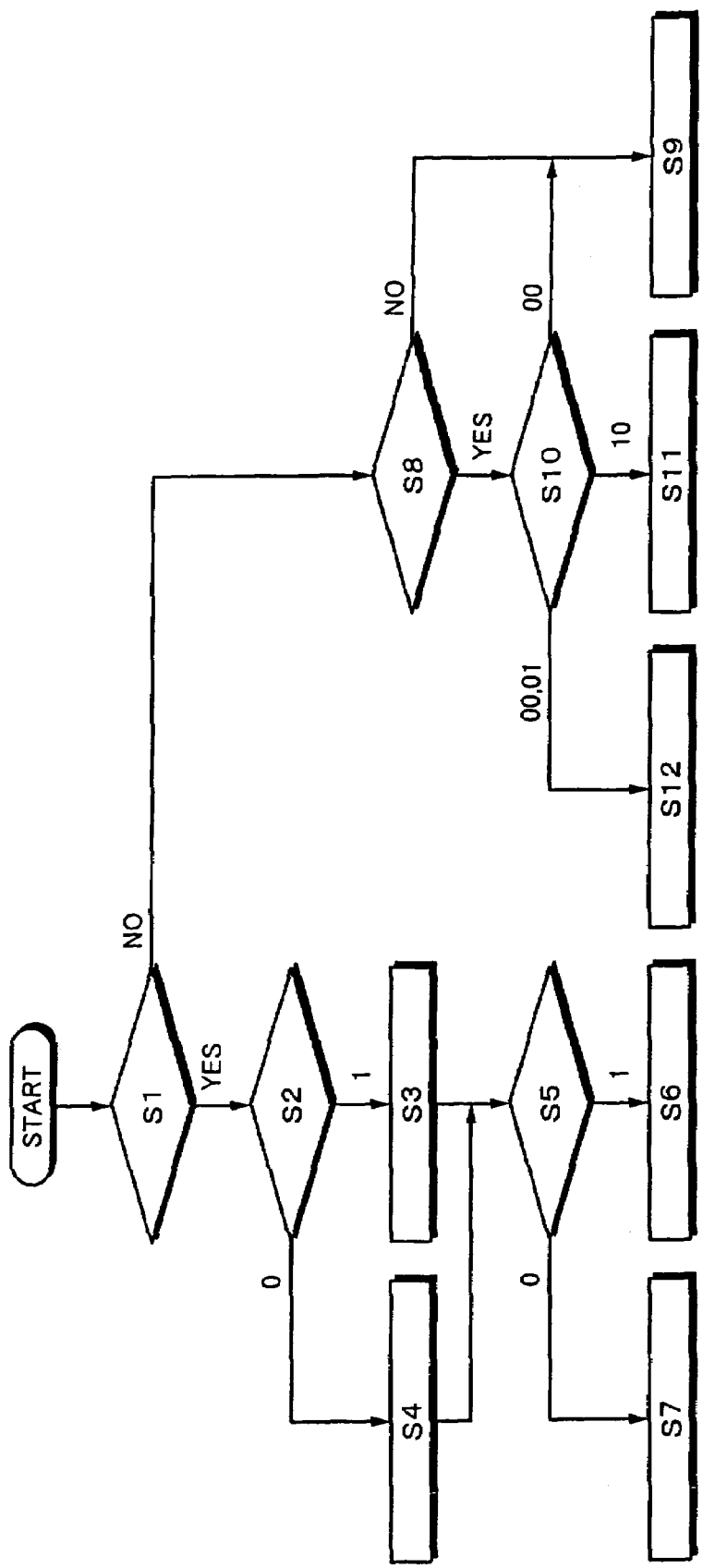
FIG. 10 is a flowchart of an example of a processing sequence of the receiver.

FIG. 10 is a flowchart showing a processing sequence of the receiver for the still image copy control descriptor (still_image_copy_control_descriptor). In this sequence, the recording to the recording medium and the print-out are controlled on the basis of the description of the still image copy control descriptor (still_image_copy_control_descriptor). If the still image copy control descriptor (still_image_copy_control_descriptor) is not described, the setting by the wording change as mentioned above is made.

Whether or not the still image copy control descriptor (still_image_copy_control_descriptor) has been arranged in the PMT is discriminated (step S1).

If the still image copy control descriptor (still_image_copy_control_descriptor) has been arranged in the PMT, whether or not printing_control is equal to "1" is discriminated (step S2). If printing_control is equal to "1", the printing process is executed in accordance with the describing conditions of print_prohibited, print_constraint_bit, number_ of_print, image_resolution_control, and expiration_ date (step S3).

If printing_control is equal to "0", the printing can be performed without any restricting condition (step S4).

Subsequently, whether or not recording_control is equal to "1" is discriminated (step S5). If recording_control is equal to "1", the recording process is executed in accordance with the describing conditions of record_prohibited, recording_security, print_prohibited, number_of_print, image_resolution_control, and expiration_date (step S6).

If recording_control is equal to "0" in step S5, the recording process can be performed without any restricting condition (step S7).

If the still image copy control descriptor (still_image_copy_control_descriptor) is not arranged in the PMT in step S1, whether or not the digital copy control descriptor (digital_copy_control_descriptor) exists in the PMT is discriminated (step S8).

If the digital copy control descriptor (digital_copy_control_descriptor) does not exist, the printing and the recording can be performed without any restricting condition (step S9).

If the digital copy control descriptor (digital_copy_control_descriptor) exists in step S8, the value of digital_recording_control_data is discriminated (step S10).

If digital_recording_control_data is equal to "00" in step S10, the printing and the recording can be performed without any restricting condition (step S9).

If digital_recording_control_data is equal to "10" in step S10, (print_prohibited=0, print_constraint_bit=1, number_of_print=000001) and it is processed by setting the mode in which only one sheet can be printed. (record_prohibited=0, recording_security=1, print_prohibited=0, number of record=1) and, with respect to the recording, the recording can be performed only to the recording medium in which the security has been defined (step S11).

If digital_recording_control_data is equal to "01" or "11" in step S10, (print_prohibited=1, record_prohibited=1) and the printing and the recording are inhibited (step S12).

Figure 11:
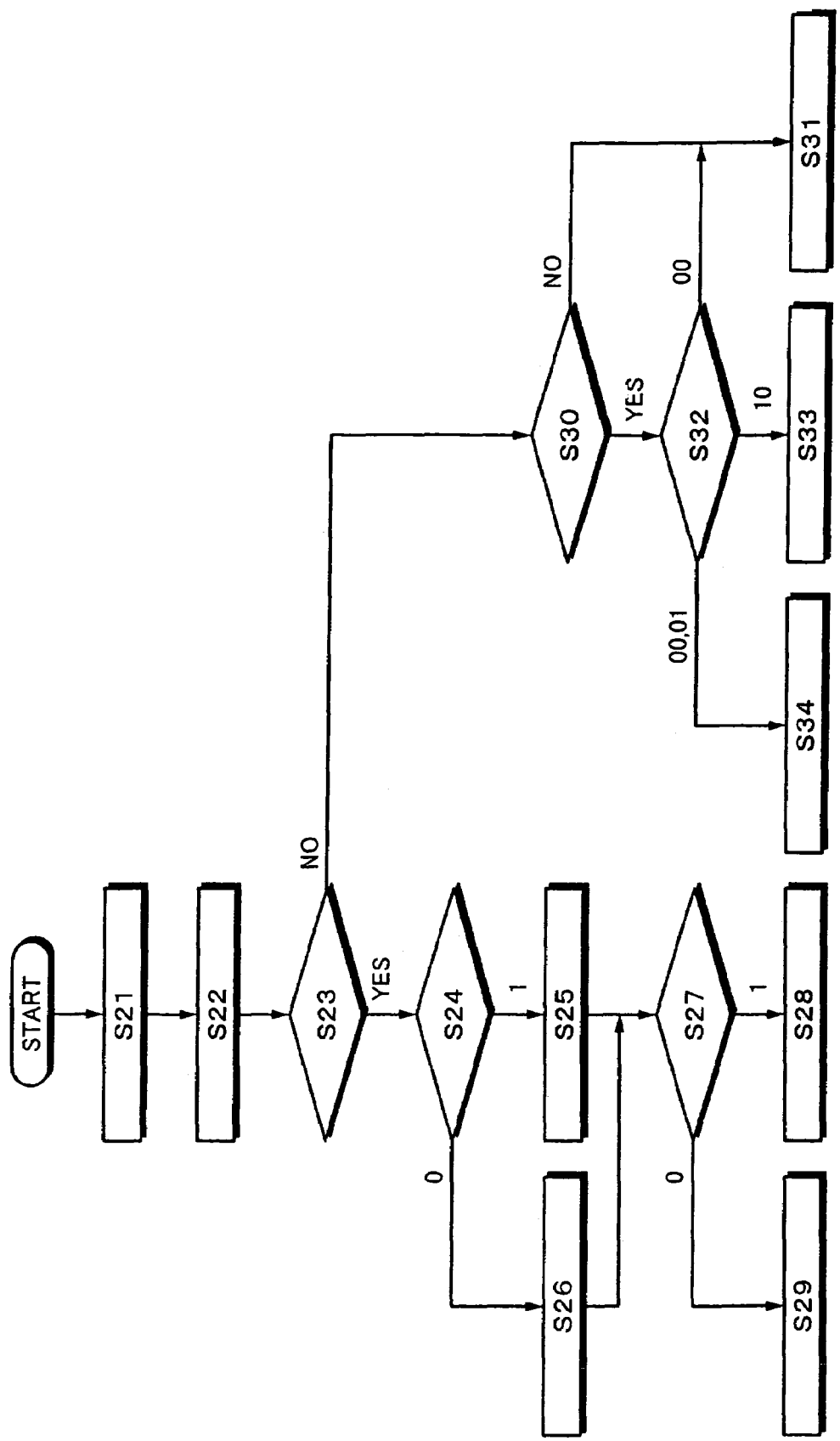
FIG. 11 is a flowchart of an example of a reserving sequence of the receiver.

FIG. 11 is a flow chart showing a reserving sequence of the receiver for the still image copy control descriptor (still_image_copy_control_descriptor). According to this sequence, the recording to the recording medium and the reservation of the print-out are controlled on the basis of the description of the still image copy control descriptor (still_image_copy_control_descriptor). If the still image copy control descriptor (still_image_copy_control_descriptor) is not described in the EIT and the SDT, the setting by the wording change as mentioned above is made.

When the mode to select the reservation program is set (step S21) and the reservation program is selected, the EIT and the SDT of the reservation program are obtained (step S22). Whether or not the still image copy control descriptor (still_image_copy_control_descriptor) has been arranged in the program information of the EIT or the SDT (step S23).

If the still image copy control descriptor (still_image_copy_control_descriptor) has been arranged in the program information of the EIT and the SDT, whether or not printing_control is equal to "1" is discriminated (step S24). If printing_control is equal to "1", the print reserving process is executed in accordance with print_prohibited, print_constraint_bit, number_of_print, image_resolution_control, and expiration_date (step S25).

If printing_control is equal to "0", the reserving process in which the printing is possible without any restricting condition is executed (step S26).

Subsequently, whether or not recording_control is equal to "1" is discriminated (step S27). If recording_control is equal to "1", the recording reserving process is executed in accordance with record_prohibited, recording_security, print_prohibited, number_of_print, image_resolution_control, and expiration_date (step S28).

If recording_control is equal to "0" in step S27, the reserving process in which the recording is possible without any restricting condition is executed (step S29).

If the still image copy control descriptor (still_image_copy_control_descriptor) is not arranged in the program information of the EIT and the SDT in step S23, whether or not the digital copy control descriptor (digital_copy_control_descriptor) exists in the EIT or the SDT is discriminated (step S30).

If the digital copy control descriptor (digital_copy_control_descriptor) does not exist in the EIT or the SDT, the reserving process in which the printing and the recording are possible without any restricting condition is executed (step S31).

If the digital copy control descriptor (digital_copy_control_descriptor) exists in the EIT or the SDT in step S30, the value of digital_recording_control_data is discriminated (step S32).

If digital_recording_control_data is equal to "00" in step S32, the printing and recording can be performed without any restricting condition (step S31).

If digital_recording_control_data is equal to "10" in step S32, (print_prohibited=0, print_constraint_bit=1, number_of_print=000001) and the reserving process in which only one sheet can be printed is executed. (record_prohibited=0, recording_security=1, print_prohibited=0, number_of_record=1) and the reserving process in which the recording can be performed only to the recording medium in which the security has been defined is executed (step S33).

If digital_recording_control_data is equal to "01" or "11" in step S32, (print_prohibited=1) and (record_prohibited=1) and the reservation of the printing and the recording are disabled (step S33).

The parameters designated by the still image copy control descriptor (still_image_copy_control_descriptor) shown in FIG. 5 are shown as one example. A descriptor in which the number of parameters is reduced can be defined or a descriptor of a different construction can be also defined to realize the same object. A definition of the copyright information in which reserved_future_use of the last field will be necessary in future can be also added. It is also possible that the parameters of the still image copy control descriptor are inserted into the area of reserved_future_use defined in the last field of the content availability descriptor (content_availability_descriptor) and substituted for the still image copy control descriptor.

DESCRIPTION OF REFERENCE NUMERALS

1 BROADCASTING STATION
2 RECEIVER
3 TELEVISION RECEIVER
5 VIDEO RECORDING AND REPRODUCING APPARATUS
6 PRINTER
7 PERSONAL COMPUTER
S1 STILL_IMAGE_COPY_CONTROL_DESCRIPTOR EXISTS IN PMT?
S2 printing_control?
S3 PRINTING PROCESS ACCORDING TO print_prohibited, print_constrain_bit, number_of_print, image_resolution_control, AND expiration_date
S4 PRINTABLE WITHOUT RESTRICTING CONDITION
S5 recording_control?
S6 RECORDING PROCESS ACCORDING TO recording_prohibited, recording_security, print_prohibited, number_of_print, image_resolution_control, AND expiration_date
S7 RECORDABLE WITHOUT RESTRICTING CONDITION
S8 DIGITAL_COPY_CONTROL_DESCRIPTOR EXISTS IN PMT?
S9 PRINTABLE AND RECORDABLE WITHOUT RESTRICTING CONDITION
S10 digital_recording_control_data?
S11 PRINTING PROCESS ACCORDING TO print_prohibited=0, print_constrain_bit=1, AND number_of_print=1 RECORDING PROCESS ACCORDING TO record_prohibited =0, record_security=1, print_prohibited=0, AND number_of_record=1
S12 PRINTING PROCESS ACCORDING TO print_prohibited=1, RECORDING PROCESS ACCORDING TO record_prohibited=1
S21 SELECT RESERVATION PROGRAM
S22 OBTAIN EIT/SDT OF RESERVATION PROGRAM
S23 STILL_IMAGE_COPY_CONTROL_DESCRIPTOR EXISTS IN EIT/SDT?
S24 printing_control?
S25 PRINT RESERVING PROCESS ACCORDING TO print_prohibited, print_constrain_bit, number_of_print, image_resolution_control, AND expiration_date
S26 PRINT RESERVING PROCESS OF PRINTABLE WITHOUT RESTRICTING CONDITION
S27 recording_control?
S28 RECORDING RESERVING PROCESS ACCORDING TO recording_prohibited, recording_security, print_prohibited, number_of_print, image_resolution_control, AND expiration_date
S29 RESERVING PROCESS OF RECORDABLE WITHOUT RESTRICTING CONDITION
S30 DIGITAL_COPY_CONTROL_DESCRIPTOR EXISTS IN PROGRAM INFORMATION OF EIT/SDT?
S31 RESERVING PROCESS OF PRINTABLE AND RECORDABLE WITHOUT RESTRICTING CONDITION
S32 digital_recording_control_data?
S33 PRINT RESERVING PROCESS ACCORDING TO print_prohibited=0, print_constrain_bit=1, AND number_of_print=1, RECORDING RESERVING PROCESS ACCORDING TO record_prohibited=0, record_security=1, print_prohibited=0, AND number_of_record=1
S34 PRINTER RESERVATION IS IMPOSSIBLE, STILL IMAGE RECORDING RESERVATION IS IMPOSSIBLE

The invention claimed is:

1. A broadcasting system comprising:
a transmitting apparatus for transmitting a digital broadcast by a stream including Program Specific Information (PSI) constituted with a structural hierarchy of an MPEG system; and
a receiving apparatus for receiving the stream transmitted from said transmitting apparatus,
wherein said transmitting apparatus allows copyright information of a still image to be included hierarchically in a predetermined table of said PSI corresponding to the structural hierarchy and transmits the obtained stream and
said receiving apparatus refers to the copyright information of said still image in said predetermined table of said PSI transmitted from said transmitting apparatus and executes a copyright protecting process of the still image by a unit corresponding to the structural hierarchy on the basis of the copyright information of said still image in said predetermined table.

2. A broadcasting system comprising:
a transmitting apparatus for transmitting a digital broadcast by a stream including Service Information (SI) constituted with a structural hierarchy of an MPEG system; and
a receiving apparatus for receiving the stream transmitted from said transmitting apparatus,
wherein said transmitting apparatus allows copyright information of a still image to be included hierarchically in a predetermined table of said SI corresponding to the structural hierarchy and transmits the obtained stream and
said receiving apparatus refers to the copyright information of said still image in said predetermined table of said SI transmitted from said transmitting apparatus and executes a copyright protecting process of the still image upon reservation by a unit corresponding to the structural hierarchy on the basis of the copyright information of said still image in said predetermined table.

3. A broadcasting system according to claim 1, wherein the structural hierarchy includes a first layer corresponding to a program and a second layer corresponding to an elementary stream in the program;
the predetermined table includes a Program Map Table (PMT) configured to include the copyright information for the first and second layers; and
the receiving apparatus executes the copyright process of the still image by the elementary stream on the basis of the copyright information with preferentially applying the copyright information of the second layer.

4. A broadcasting system according to claim 2, wherein the structural hierarchy includes a first layer corresponding to a service and a second layer corresponding to a program in the service;
the predetermined table includes a Service Description Table (SDT) configured to include the copyright information for the first layer and a Event Information Table (EIT) configured to include the copyright information for the second layer; and
the receiving apparatus executes the copyright process of the still image upon reservation by the program on the basis of the copyright information with preferentially applying the copyright information for the second layer.

5. A broadcasting system according to claim 1 or 2, wherein copyright management information of said still image can be set independent of copyright management information of a motion image.

6. A broadcasting system according to claim 1 or 2, wherein said still image is a still image obtained by extracting a part of a motion image.

7. A broadcasting system according to claim 1 or 2, wherein said still image is a still image transmitted by a data broadcast.

8. A broadcasting system according to claim 1 or 2, wherein said transmitting apparatus allows information regarding resolution of a display screen to be included in the copyright information of said still image and said receiving apparatus refers to the information regarding the resolution included in the copyright information of said still image and restricts the resolution.

9. A broadcasting system according to claim 1 or 2, wherein, in the still image transmitted by a data broadcast, it is enabled not to apply restriction of resolution only to a graphics signal of a character or the like in which there is no need to restrict the resolution.

10. A broadcasting system according to claim 1 or 2, wherein said transmitting apparatus allows information regarding recording restriction to be included in the copyright information of said still image and said receiving apparatus refers to the information regarding the recording restriction included in the copyright information of said still image and restricts the recording to a recording medium.

11. A broadcasting system according to claim 1 or 2, wherein said transmitting apparatus allows information regarding printing to be included in the copyright information of said still image and said receiving apparatus refers to the information regarding the printing included in the copyright information of said still image and restricts the printing to a printer.

12. A receiving apparatus comprising:
  receiving means for receiving a signal of a digital broadcast transmitted by a stream including Program Specific Information (PSI) constituted with a structural hierarchy of an MPEG system;
  means for decoding information in a predetermined table of said received PSI and obtaining copyright information of a still image included hierarchically in said predetermined table corresponding to the structural hierarchy; and
  means for referring to the copyright information of said still image in said predetermined table of said PSI and executing a copyright protecting process of the still image by a unit corresponding to the structural hierarchy on the basis of the copyright information of said still image in said predetermined table.

13. A receiving apparatus comprising:
  receiving means for receiving a signal of a digital broadcast transmitted by a stream including Service Information (SI) constituted with a structural hierarchy of an MPEG system;
  means for decoding information in a predetermined table of said received SI and obtaining copyright information of a still image included hierarchically in said predetermined table corresponding to the structural hierarchy; and
  means for referring to the copyright information of said still image in said predetermined table said SI and executing a copyright protecting process of the still image upon reservation by a unit corresponding to the structural hierarchy on the basis of the copyright information of said still image in said predetermined table.

14. A receiving apparatus according to claim 12, wherein when said still image copyright information in said predetermined table cannot be referred to, motion image copyright information in said predetermined table is referred to and said still image copyright information is set on the basis of said motion image copyright information.

15. A receiving apparatus according to claim 12, wherein when said still image copyright information in said predetermined table and motion image copyright information in said predetermined table cannot be referred to, said still image copyright information is set on the basis of predetermined copyright information of the still image.

16. A receiving apparatus according to claim 13, wherein when said still image copyright information in said predetermined table cannot be referred to, motion image copyright information in said predetermined table is referred to and said still image copyright information is set on the basis of said motion image copyright information.

17. A receiving apparatus according to claim 13, wherein when said still image copyright information in said predetermined table and motion image copyright information in said predetermined table cannot be referred to, said still image copyright information is set on the basis of predetermined copyright information of the still image.

18. A receiving apparatus according to claim 12 or 13, wherein information regarding resolution of a display screen is included in the copyright information of said still image, the information regarding the resolution included in the copyright information of said still image is referred to, and the resolution is restricted.

19. A receiving apparatus according to claim 12 or 13, wherein information regarding recording restriction is included in the copyright information of said still image, the information regarding the recording restriction included in the copyright information of said still image is referred to, and the recording to a recording medium is restricted.

20. A receiving apparatus according to claim 12 or 13, wherein information regarding printing is included in the copyright information of said still image, the information regarding the printing included in the copyright information of said still image is referred to, and the printing to a printer is restricted.

21. A protecting method of broadcast data, comprising the steps of:
  allowing copyright information of a still image to be included in a predetermined table in Program Specific Information (PSI) of a stream of an MPEG system hierarchically corresponding to a structural hierarchy of the MPEG system and transmitting the obtained stream;
  receiving said transmitted stream of the MPEG system; and
  referring to the copyright information of said still image in said predetermined table of said received PSI and executing a copyright protecting process of the still image by a unit corresponding to the structural hierarchy on the basis of the copyright information of said still image in said predetermined table.

22. A protecting method of broadcast data, comprising the steps of:
  allowing copyright information of a still image to be included hierarchically in a predetermined table in Service Information (SI) of a stream of an MPEG system corresponding to a structural hierarchy of the MPEG system and transmitting the obtained stream;

receiving said transmitted stream of the MPEG system; and referring to the copyright information of said still image in said predetermined table of said received SI and executing a copyright protecting process of the still image upon reservation by a unit corresponding to the structural hierarchy on the basis of the copyright information of said still image in said predetermined table.

23. A protecting method of the broadcast data according to claim 21 or 22, wherein copyright management information of said still image can be set independent of copyright management information of a motion image.

24. A protecting method of the broadcast data according to claim 21 or 22, wherein said still image is a still image obtained by extracting a part of a motion image.

25. A protecting method of the broadcast data according to claim 21 or 22, wherein said still image is a still image transmitted by a data broadcast.

26. A protecting method of the broadcast data according to claim 21 or 22, wherein upon said transmission, information regarding resolution of a display screen is included in the copyright information of said still image and, upon said reception, the information regarding the resolution included in the copyright information of said still image is referred to and the resolution is restricted.

27. A protecting method of the broadcast data according to claim 21 or 22, wherein in the still image transmitted by a data broadcast, it is enabled not to apply restriction of resolution only to a graphics signal of a character or the like in which there is no need to restrict the resolution.

28. A protecting method of the broadcast data according to claim 21 or 22, wherein upon said transmission, information regarding recording restriction is included in the copyright information of said still image and, upon said reception, the information regarding the recording restriction included in the copyright information of said still image is referred to and the recording to a recording medium is restricted.

29. A protecting method of the broadcast data according to claim 21 or 22, wherein upon said transmission, information regarding printing is included in the copyright information of said still image and, upon said reception, the information regarding the printing included in the copyright information of said still image is referred to and the printing to a printer is restricted.

30. A receiving method comprising the steps of:

receiving a signal of a digital broadcast transmitted by a stream including Program Specific Information (PSI) constituted with a structural hierarchy of an MPEG system;

decoding information in a predetermined table said received PSI and obtaining copyright information of a still image included hierarchically in said predetermined table corresponding to the structural hierarchy; and referring to the copyright information of said still image in said predetermined table of said PSI and executing a copyright protecting process of the still image by a unit corresponding to the structural hierarchy on the basis of the copyright information of said still image in said predetermined table.

31. A receiving method comprising the steps of:

receiving a signal of a digital broadcast transmitted by a stream including Service Information (SI) constituted with a structural hierarchy of an MPEG system;

decoding information in a predetermined table of said received SI and obtaining copyright information of a still image included hierarchically in said predetermined table corresponding to the structural hierarchy; and referring to the copyright information of said still image in said predetermined table of said SI and executing a copyright protecting process of the still image upon reservation by a unit corresponding to the structural hierarchy on the basis of the copyright information of said still image in said predetermined table.

* * * * *